(12) United States Patent
Levesque

(10) Patent No.: US 7,051,396 B2
(45) Date of Patent: May 30, 2006

(54) VEHICLE CLEANING ELEMENT

(76) Inventor: Gary H. Levesque, 144 Augusta National Dr., Yarmouthport, MA (US) 02675

( * ) Notice: Subject to any disclaimer, the term of this patent is extended or adjusted under 35 U.S.C. 154(b) by 355 days.

(21) Appl. No.: 10/195,496

(22) Filed: Jul. 16, 2002

(65) Prior Publication Data

US 2004/0010878 A1 Jan. 22, 2004

(51) Int. Cl.
*B60S 3/04* (2006.01)
*B60S 3/06* (2006.01)

(52) U.S. Cl. ................................ 15/230.16; 15/97.3
(58) Field of Classification Search ............. 15/97.3, 15/141.2, 230, 230.14, 230.16–230.19
See application file for complete search history.

(56) References Cited

U.S. PATENT DOCUMENTS

| | | | | |
|---|---|---|---|---|
| 2,559,001 A * | 7/1951 | Barker | ........................ | 452/93 |
| 4,161,801 A * | 7/1979 | Day et al. | .................. | 15/316.1 |
| 4,567,619 A * | 2/1986 | Clark | ........................ | 15/97.3 |
| 4,567,620 A * | 2/1986 | Hanna | ........................ | 15/97.3 |
| 4,646,380 A * | 3/1987 | Kobayashi et al. | ........... | 15/41.1 |
| 4,653,135 A * | 3/1987 | Clark | ........................ | 15/230.16 |
| 4,670,929 A * | 6/1987 | Hanna | ........................ | 15/53.3 |
| 4,901,394 A * | 2/1990 | Nakamura et al. | ............. | 15/383 |
| 5,056,181 A * | 10/1991 | Tsuchiya et al. | .......... | 15/230.16 |
| 5,134,742 A * | 8/1992 | Ennis | ........................ | 15/53.1 |
| 5,592,712 A * | 1/1997 | Favagrossa | ................... | 15/179 |
| 5,623,741 A * | 4/1997 | Clark | ........................ | 15/230.16 |
| 5,946,761 A * | 9/1999 | Ennis | ........................ | 15/230.16 |
| 6,289,544 B1 * | 9/2001 | Kirikian | ....................... | 15/97.3 |

* cited by examiner

*Primary Examiner*—Mark Spisich

(57) ABSTRACT

A vehicle cleaning element of a substantially flat configuration having a first cleaning surface provided by a portion of the flat surface and a second cleaning surface provided by radially projecting prongs or tines for reaching into and pulling out dirt and debris from seams, openings and crevices on a vehicle. The first cleaning surface and second cleaning surface may be divided by water and dirt channeling grooves and utilize stiffeners and means for varying the radial forces on the prongs or tines for reaching into and cleaning openings, seams and crevices. The novel vehicle cleaning element may be employed to retrofit existing automatic car washing devices or in equipment of a new design. The vehicle cleaning element can be configured for application to mitter cleaning elements and rotatable cleaning elements in automatic vehicle cleaning operations.

20 Claims, 12 Drawing Sheets

Fig. 5
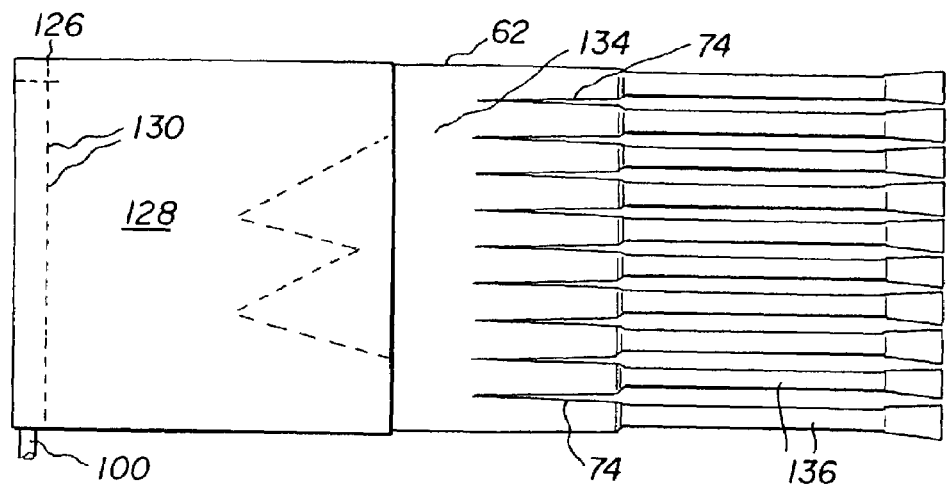
Fig. 6
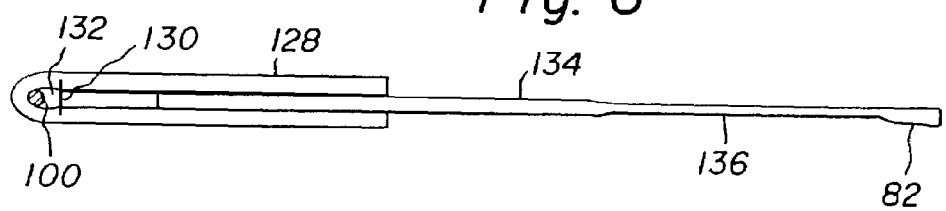
Fig. 7
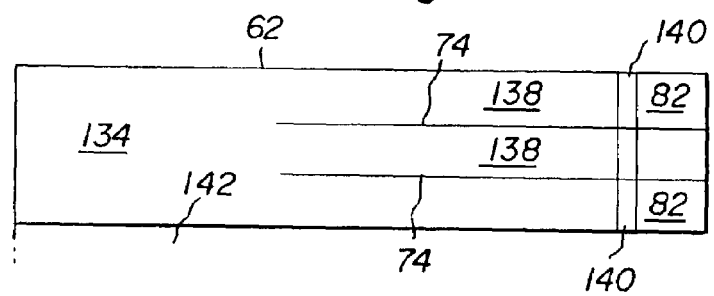
Fig. 8
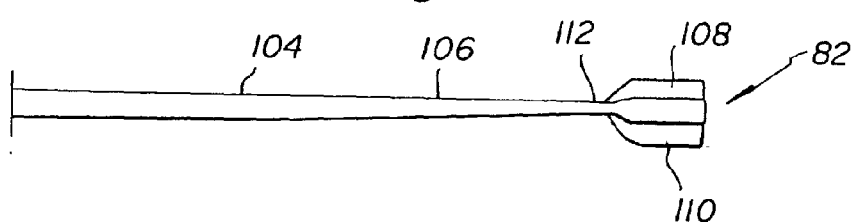
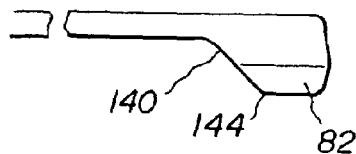
Fig. 7A

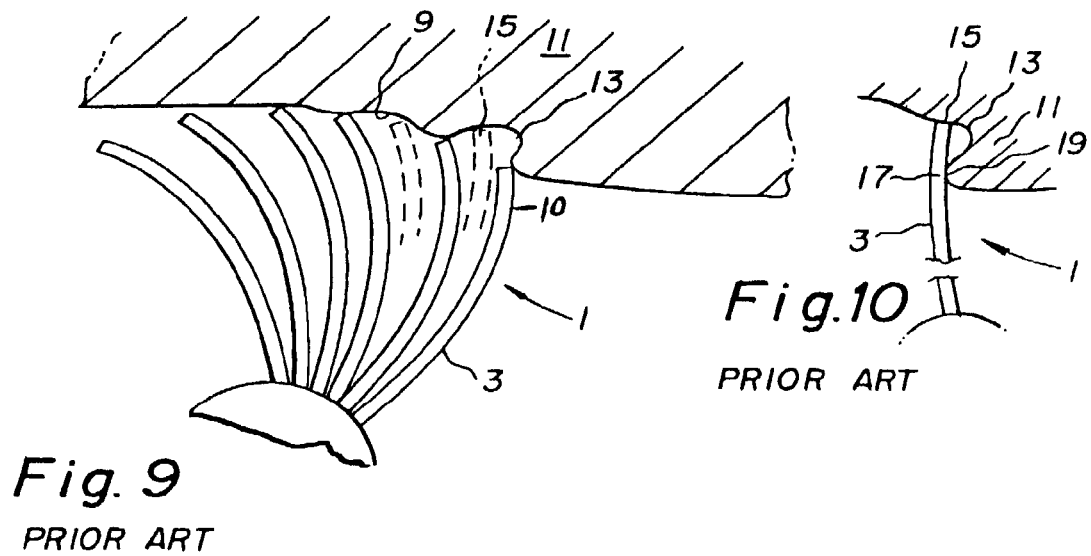
Fig. 9
PRIOR ART
Fig. 10
PRIOR ART
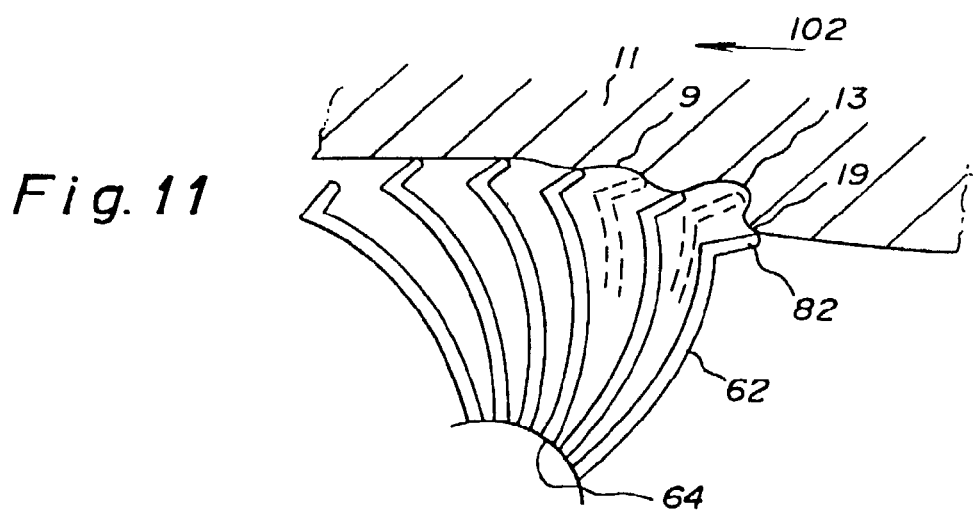
Fig. 11
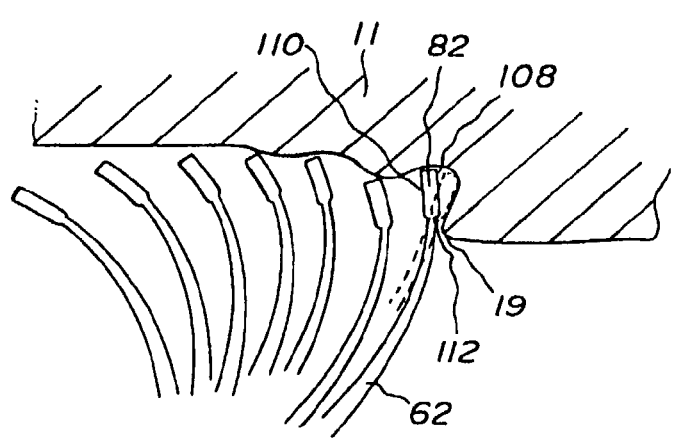
Fig. 12

Fig. 19
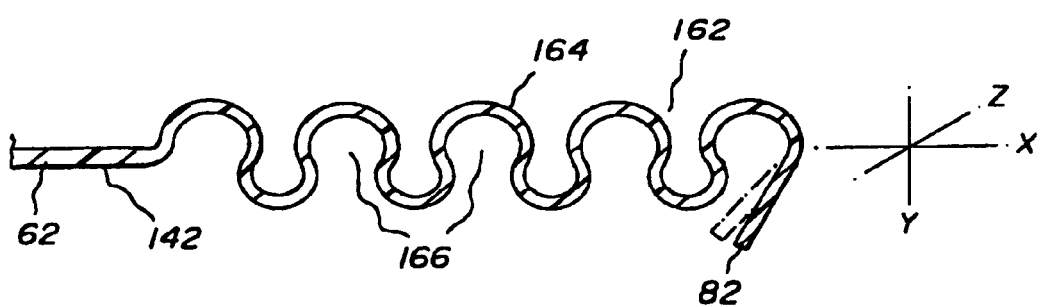
Fig. 17
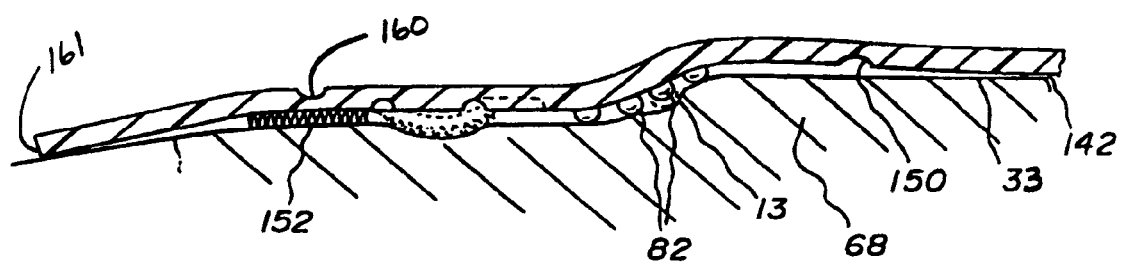
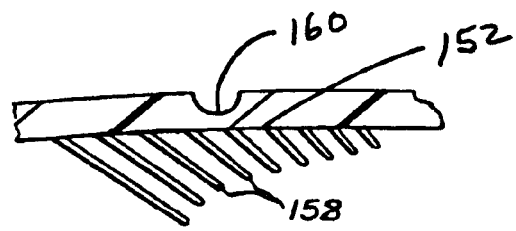
Fig. 18

Fig. 33
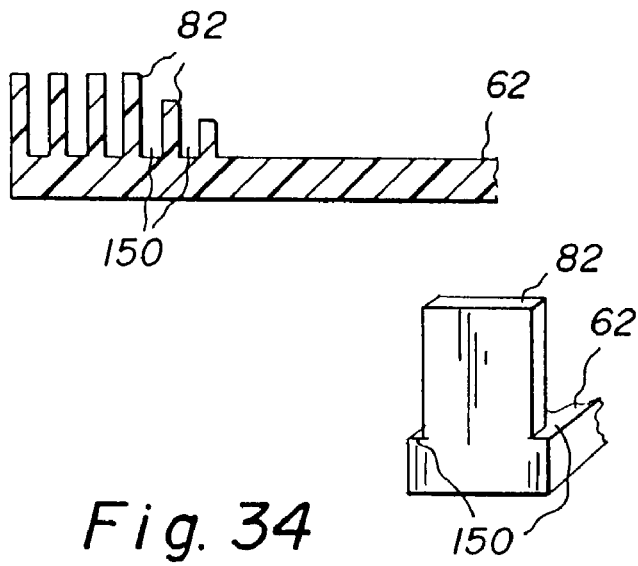
Fig. 34
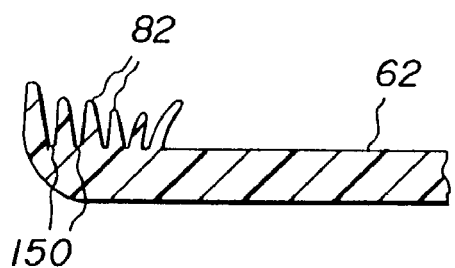
Fig. 35
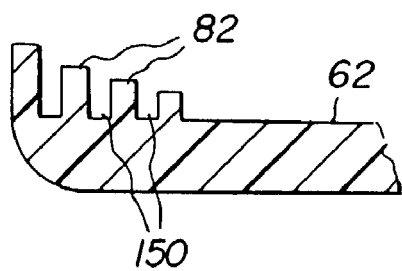
Fig. 38
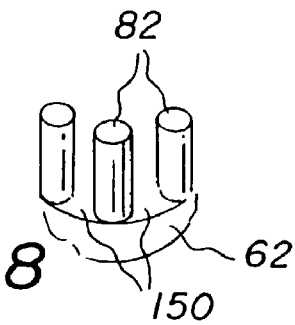
Fig. 41
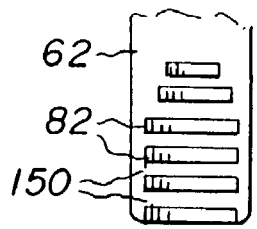
Fig. 36
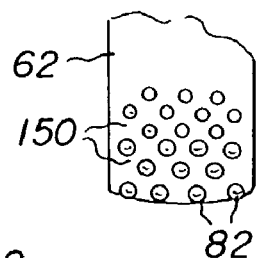
Fig. 37
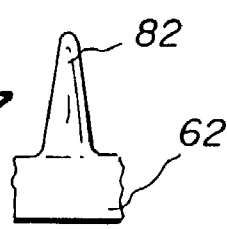
Fig. 40
Fig. 39
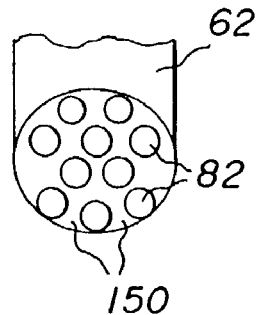

VEHICLE CLEANING ELEMENT

BACKGROUND OF THE INVENTION

1. Field of the Invention

The invention pertains to a novel vehicle cleaning element having a substantially flat planar cleaning body with one or more radially projecting surfaces projecting from the elongated cleaning body for reaching into and cleaning crevices and openings on the surface of a vehicle. More particularly, the invention pertains to closed cell mitters and rotatable cleaning pads of a substantially flat planar configuration having one or more radially projecting cleaning prongs or tines for reaching into crevices and openings on a vehicle and removing embedded dirt and debris from a vehicle in an automated car wash. The one or more radially projecting cleaning surfaces are designed to cooperate with the flat elongated surface of the pad by providing a combined rubbing action for removing dirt on flat vehicle surfaces while the projecting cleaning surfaces of the novel cleaning pad reach into crevices, angles and openings of a vehicle that otherwise are not cleaned utilizing the traditional flat elongated closed celled cleaning pads of the prior art.

The radially projecting cleaning surface may be disclosed at the end or intermediate the ends of the novel elongated pad. The radially projecting cleaning surface is designed to cooperate with the flat elongated portion of the novel cleaning pad by not only providing a traditional rubbing action for the removal of dirt but also to impart a mechanical advantage to the novel pad for reaching into crevices, angles and openings to remove dirt from vehicles that otherwise remain on vehicles utilizing prior art cleaning elements. The mechanical advantage is provided by the combination of the flat elongated surface and its weight or the use of stiffeners in combination with the radially projecting cleaning surface so that a portion of the weight normally supported by a section of pad is borne by the radially projecting cleaning surface to force the radially projecting cleaning surface into openings, angles and crevices. The novel radially projecting cleaning surface may be one or more radially projecting cleaning surfaces disposed along the length of the novel planar elongated closed cell cleaning pad. The radially projecting cleaning surface may include a plurality of radially projecting cleaning surfaces disposed at the terminal end of the elongated pad or intermediate the ends of the novel elongated pad having radially projecting cleaning surfaces.

The novel cleaning pad of the invention having a radially projecting cleaning surface may be mounted on rotatable cleaning elements or may be suspended from long elongated strips such as are common in mitter cleaning elements. In either cleaning element embodiment the novel elongated pads of the invention include a radially projecting cleaning surface disposed at an angle to the main elongated cleaning surface of the novel elongated pad. The radially projecting cleaning surfaces of the novel elongated pad may be disposed at the terminal end or intermediate the ends of the novel cleaning element and be included on one side or both sides of the elongated pad depending upon the particular type of automatic vehicle washing apparatus in which the novel pad is deployed. The novel cleaning pad with the radially projecting cleaning surface may also include channels and grooves for channeling water and dirt removed by the novel elongated cleaning pad. The novel elongated cleaning pad may further include radially projecting bristles, brushes or other cleaning elements disposed at or near the terminal end of the novel cleaning pad to reach into crevices and openings to remove dirt and provide an enhanced cleaning of vehicles in automated car wash systems.

The radial projection from the elongated cleaning pad project prong-like from the elongated pad at an angle of about 45 degrees to about 135 degrees and preferably 80 degrees to 110 degrees from the axial plane of the elongated member. The prong-like projection may be angled away from or toward the direction of travel of either the vehicle in the car wash or the directional travel of the moveable or rotatable member to which the novel elongated pad having prong-like projections is mounted upon.

The novel elongated pads with one or more prong-like projections or tines may be mounted on stationary members and take the form of mitter pads or may be attached to rotatable drums. The novel mitters and rotatable drums may be mounted in a fixed position in which the vehicle is moved through the car wash while the members are rotated or the mitters oscillated. Alternatively the novel mitters and rotatable drums may be mounted on moveable structures that move around or over the stationary vehicle as the brushes are rotated and the mitter pads are oscillated with respect to the stationary vehicle to provide a superior cleaning action for the vehicle in the automatic car wash.

The invention provides novel cleaning elements that are designed to maximize cleaning and minimize the use of space and valuable resources such as water. The novel cleaning elements may be retrofitted in existing car wash facilities and may be utilized in either stationary rotating cylindrical members or moveable rotating cylindrical members or in stationary mitters or in moveable mitters which oscillate to remove dirt from vehicles. The invention parts from the prior art by the utilization of radially projecting prongs or tines that project radially from the substantially flat elongated surface of the washing pad. The radially projecting prongs or tines projecting radially from the flat elongated cleaning pad differ from the prior art in that the radially projecting portion provides a resilient cleaning prong or tine that reaches into cracks, crevices and openings and efficiently removes dirt that otherwise would be left on the surface of a car or vehicle by a prior art cleaning element.

2. Description of the Related Art Including Information Disclosed Under 37 CFR 1.97 and 1.98

The prior art includes a wide variety of stationary, rotating and oscillating devices for holding a variety of types of washing pads and brushes for automated devices for cleaning vehicles. The prior art includes flat planar bristles, brushes such as Favagrossa U.S. Pat. No. 5,592,712 or planar deep pile fur-like pads as disclosed in Ennis U.S. Pat. No. 5,134,742 and more recently planar high density closed cell strips as is disclosed in Kirikian U.S. Pat. No. 6,289,544. These cleaning elements have been mounted on rotatable, cylindrical drums or surfaces such as Kirikian U.S. Pat. No. 6,289,544 or hung from mitters as disclosed in Hanna U.S. Pat. No. 4,567,620. All such prior art cleaning elements do not include radially projecting prongs or tines to provide a radially projecting cleaning surface for reaching into openings and crevices.

The utilization of these prior art pads in automatic vehicle washing or car washes may be arranged in stationary applications where the brushes rotate and move with respect to a stationary vehicle or where mitters oscillate and move with respect to a stationary vehicle. Alternatively, and as more commonly encountered, where the vehicle moves from station to station while substantially fixed rotatable drums and oscillating mitters rotate or oscillate while the vehicle is drawn through various staging areas of the car wash. Similarly, some hybrid systems utilize a combination of both moveable brushes and mitters with respect to the vehicles along with both stationary and fixed portions of the vehicle car wash depending upon the particular system. In all such systems the goal is to maximize cleaning and minimize space and use of valuable resources such as water.

The invention primarily pertains to closed cell pads or strips that may be mounted in rotatable drums appended from mitters that oscillate as the vehicle is drawn past the mitter or as the oscillating mitter is moved with respect to the stationary vehicle. Prior art such as Kirikian U.S. Pat. No. 6,289,544 illustrate substantially flat planar elongated pads or strips 18 which are mounted to cylindrical elements for cleaning vehicles. These pads and strips like the pads and strips of the preferred embodiment of the invention are made of high density closed cell foam material since such material does not absorb or retain dirt and is light weight and does not damage finishes of vehicles. The invention however like Kirikian U.S. Pat. No. 6,289,544 pertains to elongated pads or strips which have one or more radially projecting prongs or tines projecting radially from the longitudinal plane of the pad or strip. The invention however unlike Kirikian U.S. Pat. No. 6,289,544 provides a dual action cleaning provided by rubbing action for cleaning flat surfaces of the vehicle and a radial projecting cleaning surface for reaching into crevices and openings like fingers to remove dirt. Further the dual action cleaning of the novel cleaning element of the invention provides a mechanical leverage in operation to further assist in cleaning the contour of the vehicle.

The prior art such as Hanna U.S. Pat. No. 4,670,929 like Kirikian U.S. Pat. No. 6,289,544 provides an elongated mitter pads having a plurality of slits and sections of different density for reaching into and cleaning recesses such as found in bumpers or in grillwork. Hanna U.S. Pat. No. 4,670,929 like Kirikian U.S. Pat. No. 6,289,544 does not utilize radially projecting prongs or tines from the elongated longitudinal surface of the pad or the brush and is not able to reach in and remove dirt utilizing a plurality of projecting prongs or tines that operate or function like the tines of a rake or resilient fingers to remove dirt from crevices and openings. Similarly, Hanna U.S. Pat. No. 4,567,620 provides a plurality of mitter pads having transverse slits through the longitudinal axis of the planar pad. These transverse slits of Hanna U.S. Pat. No. 4,567,620 are designed to provide finger-like cleaning action to enhance the cleaning of the vehicle. These transverse slits like the longitudinal slits of Hanna U.S. Pat. No. 4,670,929 do not radially project and do not provide radially projecting prongs or tines capable of reaching into crevices and openings for removing dirt like the tines of a rake or resilient radially projecting fingers.

Other prior art such as Clark U.S. Pat. No. 5,623,741 provides a plurality of wavy strips and slit patterns other than parallel for cleaning vehicles. These pads with irregular fingers like the prior art are flat or planar with the longitudinal axis of the pad or brush bridge over and do not reach into crevices and openings like the novel projecting prongs or tines radially projecting from the axis of the elongated linear pad. Other prior art such as Ennis U.S. Pat. No. 5,946,746 provides a plurality of folded cleaning strips having slits parallel to the elongated axis of the pad with fur-like inserts mounted between some of the cleaning strips. These fur-like inserts are disposed between the confronting surfaces of the folded pad and do not radially project from the pad to reach into cracks and crevices as the projecting prongs or tine of the novel pad of the invention.

The prior art flat coplanar fingers do not radially project from the elongated surface of the pad and are unable to reach into cracks, crevices and openings in the same manner as the radially projecting prongs or tines of the invention which reach into recesses and crevices to pull out dirt that would otherwise remain on the vehicle. The dirt removing efficiency of the novel radially projecting prongs or tines of the novel pad maximize cleaning and save valuable resources such as water. This cleaning efficiency can be obtained utilizing the novel pads in existing automatic car washing equipment or in redesigned car washing installations utilizing the novel cleaning element.

SUMMARY OF THE INVENTION

The novel cleaning element of the invention employs an elongated pad or strip for mounting in mitters, rotatable cleaning drums, oscillating and stationary cleaning devices for cleaning vehicles. The novel cleaning element is preferably constructed of a high density closed cell foam material or material having a suitable density and thickness to form a flat elongated surface to provide a frictional rubbing action of one cleaning portion of the flat elongated surface of the pad. A second cleaning portion of the novel cleaning element is provided by a radially projecting cleaning surface which includes radially projecting prongs or tines intermediate the ends of the substantially flat elongated pad. The radially projecting prongs or tines radially projecting from the longitudinal axis of the pad to impart a resilient force perpendicular to the longitudinal axis of the pad for reaching into crevices and openings and removing or pulling out dirt similar to the action of curved fingers at the end of the hand. This action of reaching into cracks and crevices provides resiliency not only in the radial direction from the elongated axis of the pad but also resiliency in an axis parallel to the pad so that the radially projecting fingers or tines do not become hung up and lodged in windshield wipers, openings in tire rims, grillwork, air scoops or other irregular surface portions of the vehicle being cleaned by the novel pads with radially projecting prongs or tines.

The novel elongated pads are preferably formed of high density cross-linked polyolefin closed cell foam or felt pads having a tightly woven structure to be substantially impervious to water and dirt. The composition of the closed cell foam or felt pad should be substantially impervious to water and dirt and should not become water logged or have an appreciable change in density between a dry condition and a wet condition since such changes in density result in uneven cleaning action which can result in damage to the surface and finish of a vehicle. The novel elongated pads include one or more and preferably a plurality of radially projecting prongs or tines disposed intermediate the ends of the novel pad.

The radially projecting prongs or tines radially projecting from the longitudinal plane of the elongated pad may be made of the same material or of a different material than the composition of the elongated pad. For example, the radially projecting tines or prongs may be of the same closed cell composition as the elongated pad or may be of a different polymeric composition than for example a felt body elongated pad. Further the radially projecting prongs or tines may be made of natural or synthetic material as may be used in brushes and are designed to provide a resiliency in a plane parallel to the longitudinal plane of the cleaning pad to prevent the tines or prongs from becoming entangled in the structure on the vehicle.

Elongated cleaning elements constructed in accordance with the invention include a flat elongated body for providing a frictional rubbing action for cleaning the substantially flat planar areas of the car and a projecting cleaning surface that may be in the form of one or more radially projecting tines for reaching into and cleaning crevices and openings in the vehicle. The projecting prongs or tines may take the form of projecting ridges intermediate the ends of the elongated cleaning pad or include a sinusoidal-shaped configuration. The one or more projecting tines may also take the form of the radially projecting sinusoidal prongs or include projections of various configurations projecting radially from the flat surface of the pad and may include water channels, stiffeners and grooves for modifying the resiliency of the radially projecting tines in a plane perpendicular to, parallel to, or transverse to the axes of the elongated pad. The radially projecting prongs or tines may project at an angle of about 40 degrees to about 140 degrees to provide a second cleaning surface for reaching into crevices and openings depending upon the thickness of the cleaning element. In the preferred application of the invention an angle of about 80 to 100 degrees to the elongated plane of the novel elongated pad is provided for reaching into openings and crevices.

The novel elongated pads of the invention with radially projecting prongs or tines are designed to cooperate with the flat elongated surface of the pad to impart forces substantially perpendicular to the flat planar axis of the pad for reaching into seams, cracks and crevices and cleaning dirt and debris from those seams, cracks and crevices during vehicle washing operations. In addition the resiliency provided by the tines or prongs in the planes perpendicular to, transverse to and parallel to the radially projecting tines assist not only in the penetration of the tines and prongs into seams, openings and crevices but also prevent the radially projecting tines from becoming caught and lodged into openings in the vehicle or structure surrounding the vehicle such as windshield wipers, openings, wheels, etc.

The novel elongated cleaning elements may be utilized for mitter cleaning devices or for rotatable cleaning devices or any other cleaning devices utilized in an automated vehicle washing system using traditional brushes, cloths or pads for cleaning vehicles. The overall configuration of the novel pad will take different forms in terms of length, width and number of the strips as well as the arrangement of the slits whether longitudinal, horizontal, transverse or wavy depending upon the type of automatic car wash equipment utilized. The novel cleaning element of the invention employs a second cleaning surface radially projecting from the plane of the first elongated cleaning surface for reaching into crevices, openings and into seams on vehicles to provide a superior action in removing dirt by utilizing the projecting prongs or tines of the novel cleaning elements of the invention. The second cleaning surface provided by the novel projecting prongs or tines may take a variety of configurations and be resilient in a number of different directions from the novel projecting prong or tine depending upon the particular application of the novel pads in the existing or novel car washing systems employing the novel pads of the invention. The projecting prongs or tines may also be semi retractable and be disposed at places intermediate the ends of the novel cleaning elements of the invention.

The width of the cleaning pads as well as the length and thickness of the cleaning pads with two cleaning surfaces formed in accordance with the invention may vary as well as the number and arrangement of slits utilized to form strips utilizing the novel projecting prongs or tines of the novel cleaning elements of the invention. The thickness of the cleaning pad is important in relation to the projecting prongs or tines since the density and thickness of the cleaning pad provide both a rubbing action for the first cleaning surface and leverage for radial forces acting upon the projecting prongs or tines utilized for reaching into openings, crevices and seams and providing cleaning action for the second cleaning surface. More particularly the length, width and thickness provides a rubbing action for flat surfaces in mitter pads and rotatable pads for the first cleaning surface. The thickness of the pad increases the weight and efficiency of the first cleaning surface as well as adding weight to increase the radial forces on the projecting prongs or tines. This relationship however is at the expense of the ability of the projecting prongs or tines to reach into small crevices or openings. This relationship is optimized by employing tapered projecting prongs and tines for reaching into the small crevices or openings or utilizing different materials for the first cleaning surface and the second cleaning surface.

In general the thickness of the body of the first cleaning surface employing a closed cell high density polymer is about 0.06 of an inch thick to about 0.5 inches thick (0.15 cm to 1.3 cm) and preferably of a thickness of about 0.1 of an inch thick to 0.25 of an inch thick (0.25 cm to 0.63 cm ). The thickness of the radially projecting tines preferably tapers from the first cleaning surface to a thickness of about 0.01 of an inch to about 0.25 of an inch (0.02 cm to 0.63 cm) and preferably about 0.03 of an inch to about 0.18 of an inch (0.07 cm to 0.4 cm) with or without spaces between the projecting prongs or tines. The width of the projecting prongs or tines is about 0.06 of an inch to about 0.5 of an inch (0.15 cm to 1.2 cm).

The body of the novel cleaning pad and first cleaning surface may also be formed of high density felt and cloth materials that are hydrophobic and do not absorb or adsorb large quantities of dirt in which case the thickness of the pad is in the range of 0.003 of an inch thick to about 0.5 inch (0.008 cm to about 1.2 cm) and is preferably in the range of 0.03 of an inch thick to 0.37 of an inch thick (0.07 cm to 0.9 cm) and the projecting prongs or tines forming the second cleaning surface are in the range of about 0.03 of an inch thick to 0.25 of an inch thick (0.07 cm to 0.6 cm). Further the first and second cleaning surfaces may be made of different materials such as for example the body of the first cleaning surface is composed of felt and the second cleaning surface forming the projecting prongs or tines is composed of a closed cell high density polymer sewn to or molded into the felt material. In addition other thicknesses of cleaning pads may be utilized depending upon the types of material which provide a flat rubbing action against the surface of the vehicle and which preferably do not get water-logged or absorb dirt or large quantities of water which could otherwise damage finishes and surfaces ot the vehicle. As a result prior art compositions of cleaning pads may be utilized for the first cleaning surface with the addition of projecting prongs or tines to provide the second cleaning surface to provide the novel cleaning elements of the invention.

The novel elongated pad with resiliently mounted radially projecting tines or prongs may be utilized as cleaning elements in a variety of existing automatic car washing equipment but providing a suitable attachment means or a suitable attachment end of the novel pad. These attachment means can include mounting ribs, crevices, folds or other suitable mounting means for mounting two rotatable automatic car wash drums, wheels or mitter structures which may be stationary or moveable with respect to the vehicle. The novel vehicle cleaning elements may be retrofitted to existing car washing mitter and rotatable cleaning elements or applied to mechanical cleaning elements especially designed to take advantage of the increased efficiency of novel cleaning elements constructed in accordance with the invention.

The foregoing structures, elements, applications and advantages in utilizing the novel cleaning elements of the invention employ a combination of elements utilized to increase the efficiency of the cleaning element to save valuable resources such as space, water and soap while providing enhanced cleaning. The advantages of the invention will in fact be illustrated in the following brief description of the drawings.

BRIEF DESCRIPTION OF THE SEVERAL VIEWS OF THE DRAWINGS

The objects and advantages of the invention will become more apparent to those skilled in the art of cleaning elements of the general type to which this invention pertains along with the description and discussion of the drawings and described in the Detailed Description of the Invention. These objects and advantages of the invention will become apparent with reference to the following drawings in which:

FIG. 5 is a bottom plan view of one embodiment of a novel cleaning element with projecting prongs or tines constructed in accordance with one embodiment of the invention;

FIG. 6 is a side elevational view of the novel cleaning element of FIG. 5.;

FIG. 7 is a bottom plan view of a further embodiment of a novel cleaning element with projecting prongs or tines in accordance with a further embodiment of the invention;

FIG. 7A is a side view of the novel cleaning element of FIG. 7;

FIG. 8 is a side view of a further embodiment of the novel cleaning element of FIG. 7 designed to clean in two opposite directions;

FIG. 9 is a side elevational view of a prior art cleaning element cleaning a surface of a vehicle having an uneven surface;

FIG. 10 is close-up view of FIG. 9 illustrating the bridging action of a prior art cleaning element inhibiting the cleaning a crevice or seam on a vehicle surface;

FIG. 11 is a side elevational view illustrating the cleaning action of novel cleaning elements having radially projecting prongs or tines cleaning the same vehicle surface having a crevice or seam;

FIG. 12 is a side elevational view similar to FIG. 11 illustrating the operation of novel cleaning elements with projecting prongs or tines in cleaning the same crevices or seam on an uneven surface of a vehicle;

FIG. 17 is a side elevational view of the novel cleaning element of FIG. 16 illustrating the cleaning action of the novel prongs or tines in relation to channeling as the novel element moves across the surface of a vehicle;

FIG. 18 is an enlarged side elevational view of a portion of the end of FIG. 17;

FIG. 19 is a further embodiment of a novel cleaning element having a radially projecting prongs or tines constructed in accordance with a further embodiment of the invention;

FIGS. 33–35 are side elevational views of further embodiments of the novel cleaning element with projecting prongs or tines;

FIG. 36 is a perspective view of a further embodiment for a projecting prong or tine for a novel cleaning element constructed in accordance with the invention;

FIG. 37 is a side elevational view of a further embodiment of a projecting prong or tine for a cleaning element in accordance with the present invention;

FIG. 38 is a perspective view of a further embodiment for projecting prongs or tines for a cleaning element with provision for water channeling for a novel cleaning element in accordance with the invention;

FIG. 39 is a perspective view of a further embodiment for projecting prongs or tines with provision for water channeling for a novel cleaning element constructed in accordance with the invention;

FIG. 40 is a bottom elevational view of a portion of a novel cleaning pad having projecting prongs or tines with provision for water channeling constructed in accordance with an embodiment of the invention;

FIG. 41 is a bottom plan view similar to FIG. 40 having an alternative embodiment for projecting prongs or tines with provision for water channeling constructed in accordance with the invention;

DETAILED DESCRIPTION OF THE INVENTION

Figure 1:
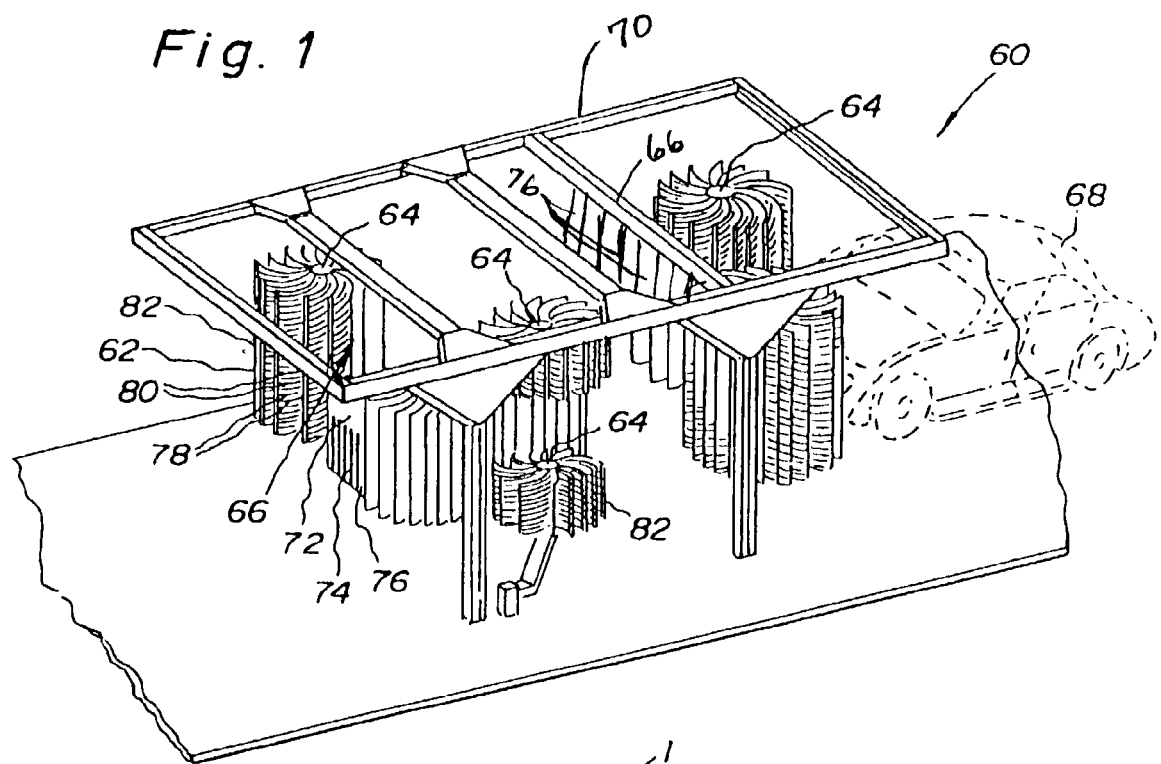
FIG. 1 is a perspective view of one embodiment of a vehicle washing system employing novel cleaning elements of the invention.
Figure 3:
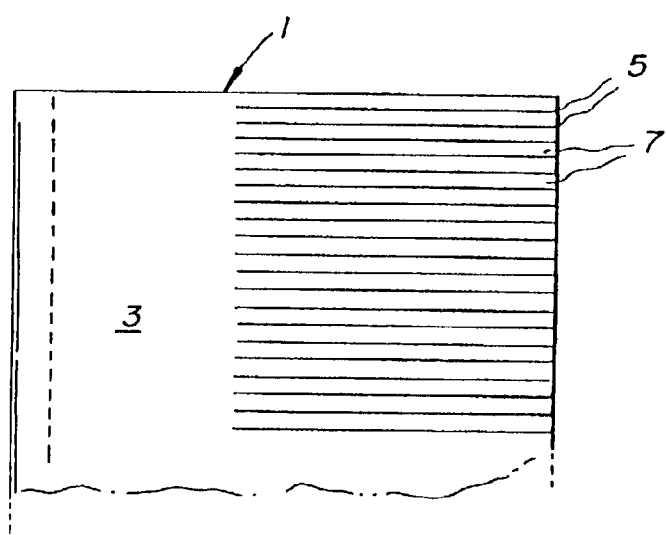
FIG. 3 is a top plan view of a prior art cleaning element that may be mounted on rotatable cleaning drums or utilized in mitter cleaning elements.
Figure 4:
FIG. 4 is a side view of the cleaning element of FIG. 3.

The novel cleaning element of the invention includes a flat elongated element having a first cleaning surface and one or more projecting prongs or tines radially projecting from the flat coplanar surface of the pad to provide a second cleaning surface for reaching into crevices, cracks, openings and indentations on the surface of the vehicle to remove dirt and debris that prior art planar pads are unable to dislodge. The novel elongated cleaning elements of the invention include a mounting portion for mounting the cleaning element to stationary or oscillating mitters or to stationary or moveable rotating drums. The two cleaning surfaces of the novel pad utilize a traditional rubbing action achieved by the flat cleaning surface and a second cleaning surface provided by a plurality of projecting prongs or tines that project at an angle to the flat planar surface of the elongated pads.

The elongated pads preferably include a plurality of slits that may run longitudinally, transversely or diagonally with respect to the pads to form strips that form the first cleaning surface and provide a second cleaning surface by utilizing one or more radially projecting prongs or tines to reach into cracks, crevices, seams and openings of a vehicle to provide superior cleaning action like the curved fingers of a human hand which exert angular forces to reach into irregular surfaces of the vehicle. In the best mode of the invention novel cleaning elements with two cleaning surfaces are preferably composed of a high density closed cell foam for both the first cleaning surface and the second cleaning surface. Preferably the novel cleaning elements are made of cross-linked polyolefin closed cell foam which does not absorb moisture, water or retain dirt. The two cleaning surfaces of the novel cleaning elements of the invention may also be advantageously employed using materials other than high density cross-inked polyolefin foam such as various high density felt materials and cloth materials that do not retain large amounts of water or dirt and debris as are utilized in known prior art washing pads and elements. Further the novel cleaning elements having two cleaning surfaces may be constructed of heterogeneous materials so that one cleaning surface of the cleaning element is composed of a high density closed felt material and the second cleaning surface is composed of a high density closed cell foam.

The two cleaning surfaces of the novel cleaning element may be varied in relation to each other to maximize rubbing action and reaching into and prying out dirt utilizing one or more projecting prongs or tines that project radially away from the coplanar surface of the novel elongated cleaning element. The novel elongated cleaning element of the invention may have the first cleaning surface disposed at one end and along the length of the novel elongated pad and the second cleaning surface disposed at the other end. Alternatively the first cleaning surface may be disposed at one portion along the length of the novel cleaning element and the second cleaning portion may be disposed intermediate the ends of the novel elongated cleaning element. In addition the second cleaning surface composed of resiliently attached prongs or tines may be disposed intermediate the ends of the novel cleaning element so that the prongs or tines provide a resilient rubbing surface disposed at an angle to the planar axis of the elongated pad and which provide resiliency in perpendicular, coplanar and transverse axes to the planar axis of the novel elongated cleaning element. The novel cleaning elements of the invention may be employed in a variety of cleaning apparatus including oscillators, stationary, moveable and oscillating mitters or in rotating cleaning elements mounted on cylindrical drums which may be rotatable in a fixed position or rotatable and moveable to a plurality of positions with respect to the vehicle.

Figure 2:
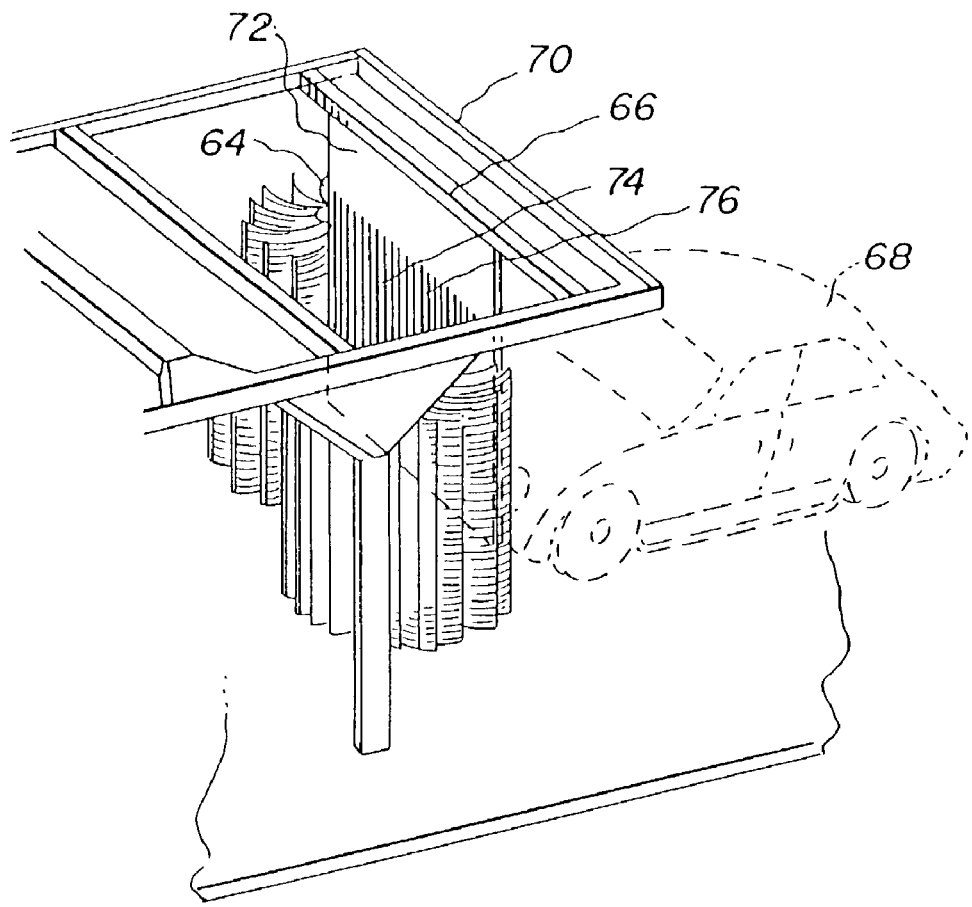
FIG. 2 is a perspective view of a further embodiment of a vehicle washing system employing novel cleaning elements of the invention.

Referring now to FIG. 1 a vehicle washing apparatus 60 is illustrated having novel cleaning elements 62 mounted on rotatable cylindrical drums 64 or mounted on a mitter frame 66 for washing a vehicle 68. The vehicle washing apparatus may be of the staged variety where vehicle 68 is drawn through the vehicle washing apparatus as is illustrated in FIG. 1 or where the frame 70 carrying the mitter frame 66 and rotatable cylindrical drums 64 move around vehicle 68 while vehicle 68 remains in a substantially stationary position (FIG. 2). Alternatively, a hybrid system with both moving rotatable cylindrical drums and mitter frames in combination with stationary vehicle washing elements may be employed utilizing the novel cleaning elements of the invention.

The novel cleaning elements or pads may be in the form of long elongated mitter pads 72 having longitudinal slits 74 transverse or wavy slits (not shown) or be mounted to rotatable cylindrical drums 64 and have a plurality of horizontal slits 78 (FIG. 1) to form a plurality of individual pads 80.

Figure 15:
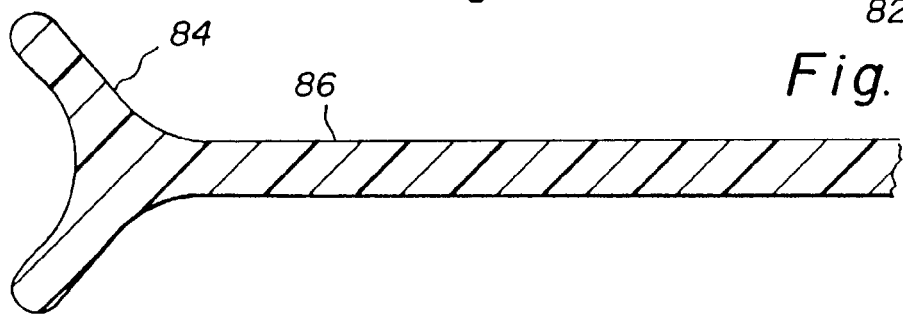
FIG. 15 is a side elevational view of a further embodiment of a novel cleaning element having projecting prongs or tines designed to clean in opposite directions.
Figure 23:
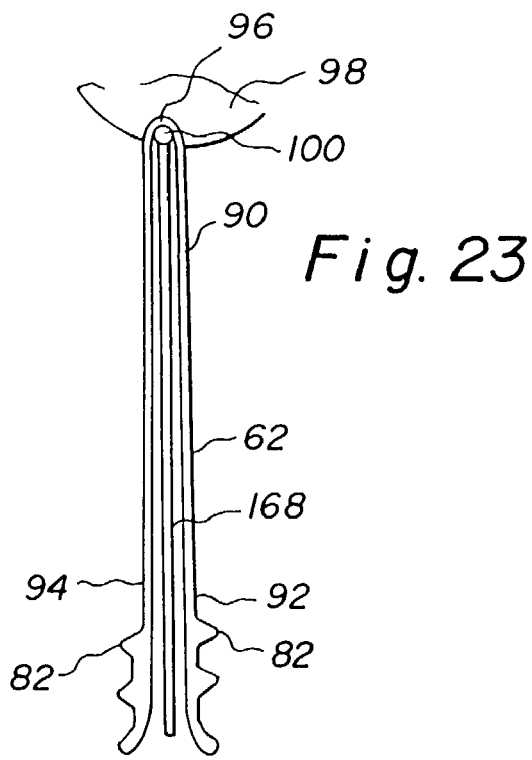
FIG. 23 illustrates a further embodiment of a novel cleaning element with prongs or tines and a stiffener.
Figure 24:
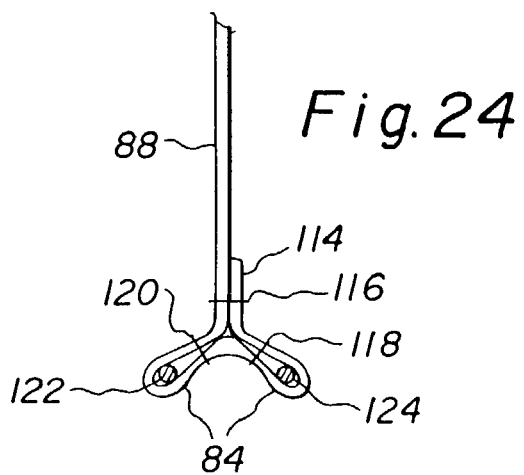
FIG. 24 is a side elevational view of a further embodiment of a cleaning element for cleaning in two different directions constructed in accordance with the invention.

Mitter pads 76 may be formed from a single sheet with slits 74 (FIG. 2) or from a plurality of individual strips (FIG. 1) in a manner similar to rotatable wash pads 80. In either embodiment of the invention mitter pads 76 and rotatable wash pads 80 include a second cleaning surface composed of one or more projecting prongs 82 which are designed to radially project in a plane substantially perpendicular to the direction of travel of the vehicle or the direction of travel of the moveable mitter or rotatable brush. In applications where the mitter or rotatable brush travels in both directions projecting prongs 82 are designed to project in substantially opposite perpendicular directions as double projecting prong 84 as provided on the novel cleaning pad 86 as illustrated in FIG. 15 or double projecting prong 84 in cleaning pad 88 as illustrated in FIG. 24. Alternatively, as illustrated in FIG. 23, a single cleaning pad 90 having projecting prong 82 at both ends 92 and 94 may be bent around the middle 96 and attached to drum 98 by a restraining rod 100. As will be also recognized two individual novel cleaning elements 62 can be placed back to back and attached in drum 98 to provide the same type of structure for rotation in both a clockwise and counterclockwise direction as well as in rotatable cylindrical drum 64 to provide for rotation in both a clockwise and counterclockwise direction.

In the same manner mitter pads 76 (FIGS. 1 and 2) have projecting tines projecting toward the vehicle or in the direction of travel of the mitter where the mitter assembly moves with respect to a stationary vehicle. Where the mitter moves in both a forward direction and a reverse direction the projecting prongs are designed as a double projecting prong 84 as illustrated on cleaning pad 86 in FIG. 15.

Referring now to FIGS. 3, 4, 9, 10, 11 and 12 the differences between the prior art and novel cleaning element of the invention is illustrated. Prior art cleaning pads 1 have a flat planar surface 3 which provides only one-dimensional cleaning surface for the prior art cleaning pad. The prior art cleaning pad may include a plurality of slits 5 which results in the formation of a plurality of cleaning strips 7 which divide the one-dimensional cleaning surface into a divided one-dimensional cleaning surface to assist in the cleaning of vehicle surfaces. These strips are generally flat in configuration and assist in increasing the efficiency of the cleaning pad by allowing divided one-dimensional cleaning surface to reach into relatively shallow seams 9 on the surface 11 of vehicle 68 (FIG. 9). The relationship between the number of prior art strips and the cleaning efficiency of the one-dimensional divided cleaning surface is interrelated to the contour of the surface of vehicle to be cleaned as well as the ability of the flat cleaning surface to spread over the contour of the vehicle.

For example, where the vehicle has large flat surfaces the cleaning strips 7 are as wide as possible to provide the greatest rubbing action against the surface of the vehicle to remove dirt and debris. Those skilled in the art will recognize that modern vehicles are not flat and that the contour of the vehicle requires a plurality of smaller strips. The problem with the dividing of the one-dimensional cleaning surface into smaller strips is a diminishing return of cleaning and rubbing action by the smaller strips on flat surfaces in order to increase greater cleaning action for surfaces having irregular contoured surfaces. This relationship not only pertains to rotatable brushes but also for long mitter strips which are utilized to clean the top surfaces of the vehicles while the rotatable cylindrical drums 64 have smaller strips to reach into crevices. In either embodiment the flat one-dimensional cleaning surface strips of the prior art become ineffective in cleaning deeper seams and crevices in vehicle surface 11 as is illustrated in FIGS. 9 and 10. This inability to clean crevices and openings is inherent in the flat planar and one-dimensional cleaning surfaces of the prior art cleaning pad 1. The flat planar surface of the prior art cleaning pad when faced with cleaning a deep or irregular seam or opening 13 results in end 15 reaching into a portion of the irregular seam or crevice or opening 13 until the side face portion 17 (FIG. 10) contacts a confronting contoured surface 19 resulting in the bridging of the one-dimensional cleaning surface 10 from the crevice or opening 13 leaving dirt and debris in the crevice seam or opening 13.

The invention in contrast departs from the prior art by employing a two-dimensional or second cleaning surface provided by projecting prongs or tines 82 which not only follow and reach into small seams 9 (FIG. 11) but also follow and reach into crevice or openings 13 to remove dirt and debris that would otherwise remain in crevice 13. The projecting prongs or tines 82 at the ends of the novel cleaning elements 62 are designed to either rotate in a direction facing the direction of rotation of the rotational cylindrical drum 64 or in the case of mitter pads 72 to face in a direction opposite to the travel of the vehicle as represented by arrow 102 (FIG. 11). As can be seen from the embodiment as illustrated in FIG. 12 the two-dimensional or second cleaning surface provided by the projecting tines 82 may project in both a forward and rearward direction as is also illustrated by projecting prong 104 (FIG. 8) by projecting radially from flat planar surface 106 in an upper projection 108 and a lower projection 110. The upper projection 108 and lower projection 110 are designed to project from either flat surface 106 or a tapered portion 112 to allow the projecting projection 108 to reach into and clean crevice 13 while avoiding abutting contoured surface 19 when the novel cleaning element 62 is rotated in a clockwise direction and utilized upper projecting projection 108 when the novel cleaning element 62 with a two-dimensional cleaning surface is rotated in a counterclockwise direction.

It will be recognized by those skilled in the art that the upper projection 108 and lower projection 110 can be utilized in mitter pad cleaning elements which move both in a forward and a reverse direction to clean vehicles in automated car washes. The double projecting prong 82 formed by upper projection 108 and lower projection 110 can be utilized in many different configurations for novel cleaning elements constructed in accordance with the invention. For example, double projecting prong 84 may be varied to provide configurations such as double projecting prong 84 in FIG. 15 which is molded to form a unitary cleaning element with two cleaning surfaces as illustrated for cleaning pad 86 (FIG. 15) or it can be achieved by sewing or sealing the end of a strip 114 with securing means 116, 118 and 120 to form a dual projecting prong 84 (FIG. 24). Cylindrical rubber strips 122 and 124 may be placed in the interior and covered to assist in providing a double pronged cleaning element having two cleaning surfaces. Alternatively a single cleaning pad 90 having projecting prongs 82 may be utilized as heretofore described (FIG. 23) to provide radially projecting prongs or tines for the novel cleaning elements of the invention on cylindrical rotating surfaces that rotate in both a clockwise or a counterclockwise direction or on moveable mitter devices that are stationary or oscillate and which travel both in a forward direction and in a reverse direction with respect to the vehicle.

As will be recognized from FIGS. 11 and 12 the novel two-dimensional cleaning surface provided by the projecting prongs or tines of the invention reach into crevices, openings and seams that cannot be reached by one-dimensional cleaning pads of the prior art. The novel cleaning pads of the invention include projecting prongs which project in a single direction for mitter assemblies which provide cleaning in one direction and for cleaning elements that provide cleaning by rotation in only one direction or a double prong device where the novel cleaning element is attached to mitters that move in both forward and reverse directions and on cylindrical cleaning elements which move in a clockwise or counterclockwise direction.

Referring now to FIGS. 5 and 6 an embodiment of the invention is illustrated having a first cleaning surface composed of felt sewn to a closed cell foam having a second cleaning surface provided by a plurality of radially projecting prongs or tines. The novel cleaning element as illustrated in FIGS. 5 and 6 is particularly suited to rotational cleaning devices such as cylindrical drums as is utilized in contemporary automatic car washing equipment. The novel cleaning element 62 in FIGS. 5 and 6 includes attachment means 126 constructed of car wash grade felt 128 forming a first cleaning surface as may be obtained from Erie Brush & Manufacturing Corp. of Chicago, Ill. which includes stitching 130 forming a pocket 132 into which a mounting rod 100 is inserted. The body of the car wash grade felt 128 is used to support an elastomeric body 134 having a second cleaning surface to form the novel cleaning element 62. The elastomeric body 134 can be cut or molded from foam sheets by fabricators skilled in the production of foam materials such as Sencorp Systems, Inc. of Hyannis, Mass. The elastomeric body 134 includes a plurality of longitudinal slits 74 which form a plurality of tapered fingers 136 which terminate in a radially projecting prong 82 for reaching into and cleaning crevices for openings 13 as heretofore described. Tapered fingers 136 taper to provide a decreasing thickness of the tapered fingers 136 in the longitudinal direction and then tapers both longitudinally and radially to provide a projecting prong designed for removing dirt from seams and crevices as heretofore described. Alternatively tapered prong 82 may taper in opposite directions as heretofore described with reference to FIG. 8. In both embodiments the tapering of fingers 136 provide a narrowed portion 112 (FIG. 12) designed to enter into openings, cracks, seams and crevices in such a manner as to prevent the uniform flat thickness of prior art cleaning elements from being blocked or forced to ride over an abutting contoured surface 19 as heretofore described with regard to FIGS. 9–12.

Referring now to FIGS. 7 and 7A an elastomeric body 134 preferably made of a closed cell polyolefin material is utilized to form a novel cleaning element 62 in accordance with the invention. Cleaning element 62 may be utilized for either mitters in which long strips of elastomeric body 134 which form a first cleaning surface that are utilized or in rotatable cleaning elements in which shorter portions of the elastomeric body are utilized. In either event a plurality of longitudinal slits 74 are provided to form cleaning strips 138 of a uniform thickness which taper 140 tapers radially to provide radially projecting prongs 82 which form a second cleaning surface for reaching into and cleaning cracks, seams and crevices 13. As heretofore described radially projecting prongs 82 radially project from the same side of the elastomeric body 134 that has the first cleaning surface that is being used to clean the vehicle. The combination of the length, density and weight in relation to the distance and length of the projecting prongs or tines transfers vertical forces to the prongs or tines. The force of gravity on first cleaning portion 142 provides a rubbing action type of cleaning which rubbing action is dissipated laterally along the length of novel cleaning element 62 until it reaches taper 140 which then translates and concentrates the vertical cleaning forces at the tips of the projecting prongs along the corner 144 and bottom surface of the projecting prongs 82 (FIG. 7A).

Figure 13:
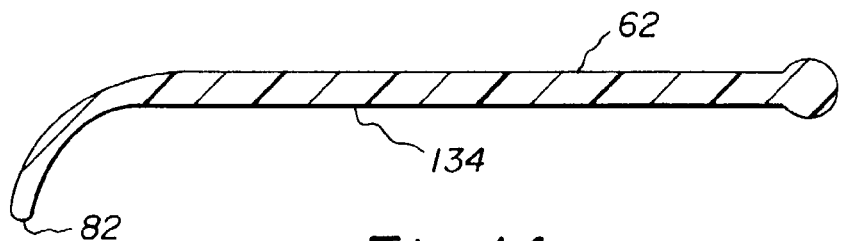
FIG. 13 is a side view of a further embodiment of the novel cleaning element with a projecting prong or tine.
Figure 14:
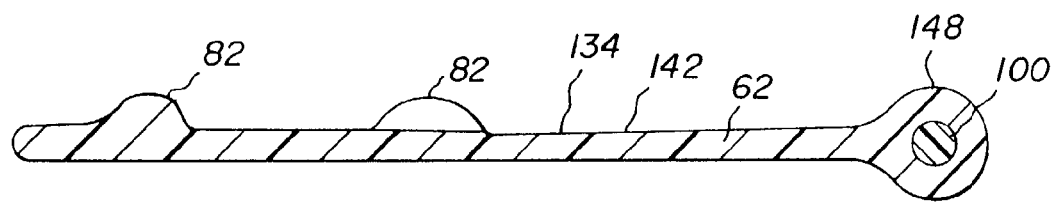
FIGS. 14 and 14A are a side elevational and end elevational view respectively of a further embodiment of a novel cleaning element with projecting prongs or tines constructed in accordance with the invention.

Projecting prongs or tines 82 forming the second cleaning surface may be in a variety of shapes and configurations to impart advantages to the novel cleaning elements of the invention. FIGS. 13 and 14 illustrate novel cleaning element 62 having an angled radially projecting prong 82 which may be disposed at the end of the novel cleaning element (FIG. 13) or the projecting prong or tine may be disposed intermediate the ends of the novel cleaning element 62 and at the lateral sides of the cleaning element as illustrated in FIG. 14. The projecting prongs 82 forming the second cleaning surface is designed to cooperate with the first cleaning surface of elastomeric body 134 so that a portion of the elastomeric body 134 provides a first cleaning surface rubbing action for cleaning substantially flat surfaces while projecting prongs 82 of the second cleaning surface employ vertical forces for reaching into cracks, crevices and openings for removing dirt.

Figure 14A:
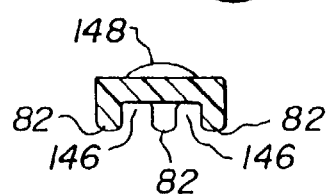
Figure 16:
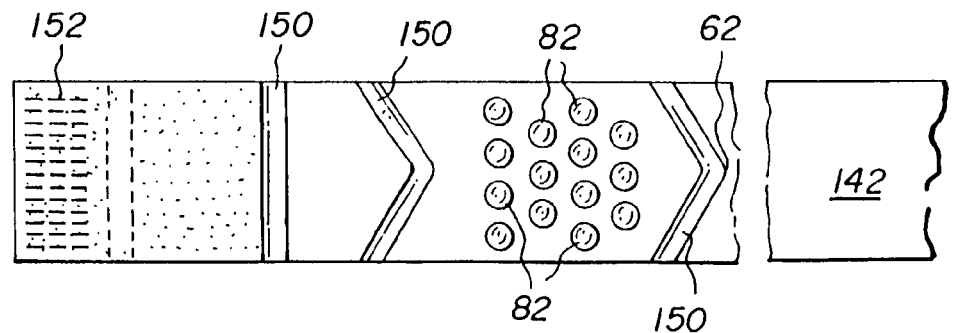
FIG. 16 is a bottom plan view of a novel cleaning element constructed in accordance with a further embodiment of the invention.
Figure 20:
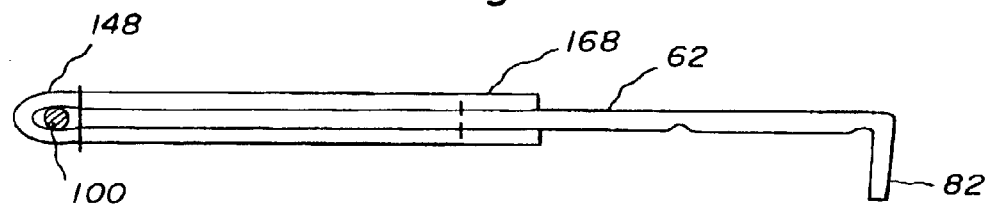
FIG. 20 is a side elevational view of a further embodiment of a novel cleaning element constructed in accordance with the invention.

The projecting prongs or tines 82 as illustrated in FIGS. 14 and 14A can also function as channels 146 through which displaced water, dirt and debris removed from flat surfaces of the vehicle by cleaning portion 142 can be removed between the different cleaning surfaces of the novel cleaning element 62. The novel cleaning element 62 may include an attachment end 148 for attaching to a rod 100 or may include a compatible mounting means for a mitter element in which the length of novel cleaning element 62 may be 2 feet to 8 feet long (60 cm to 244 cm) with each mitter strip being about 2 to 5 inches in width (5 cm to 13 cm) for hanging from a mitter frame.

Figure 52:
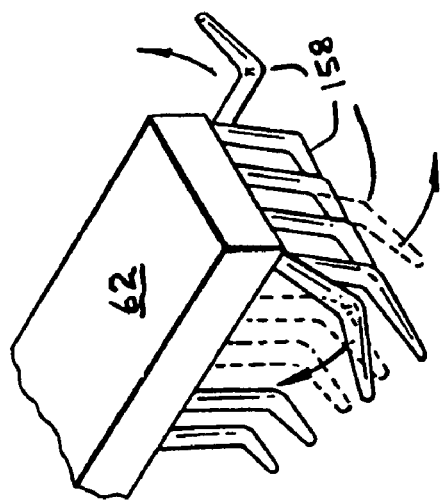
FIG. 52 illustrates the arrangement and cleaning action of the projecting prongs or tines as enlarged from FIG. 51.
Figure 51:
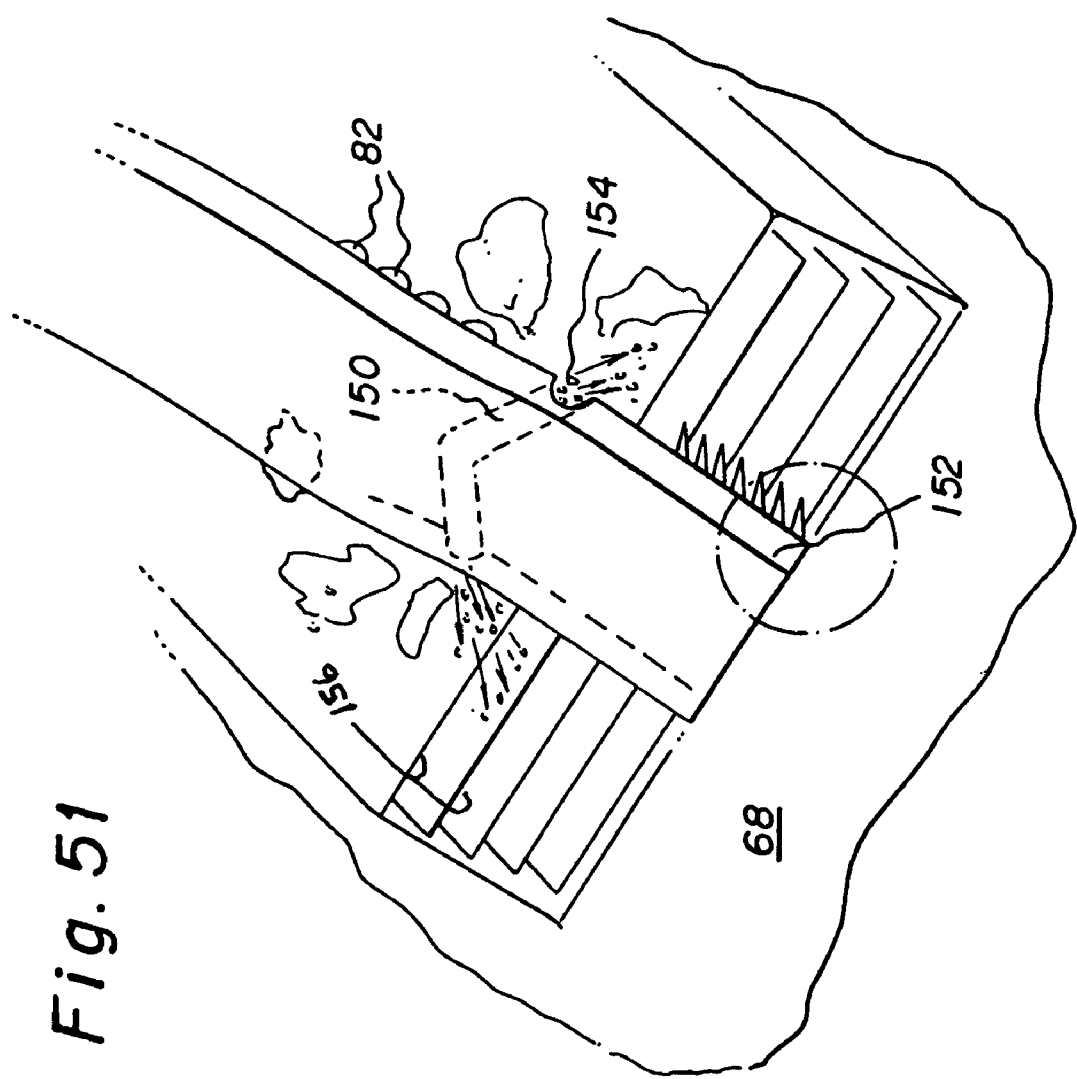
FIG. 51 is a perspective view of the cleaning action of novel cleaning elements with projecting prongs or tines and channeling constructed in accordance with the invention.

The advantages of the invention may be further enhanced by utilizing a channeling means 150 of various configurations on mitter strips and cleaning elements suitable for rotational mounting. The novel cleaning element 62 as illustrated in FIGS. 16, 17, 18 and 27 provide a first cleaning portion 142 which provides a rubbing action between the novel cleaning element 62 and the flat planar surface 33 of vehicle 68 (FIG. 17) while dirt and debris removed by the rubbing action of the first cleaning portion 142 is channeled through channel 150 away from the surface of the vehicle. The second cleaning surface provided by a plurality of projecting prongs 82 reach into crevices or opening 13 to remove dirt and debris from the crevice or opening and prevent dirt and debris from other areas of the vehicle removed by cleaning portion 142 from running into the crevice or opening 13 by the utilization of channeling means 150. Thereafter the movement of the vehicle or movement of the novel cleaning element allows dirt and debris removed from crevice or opening 13 to be channeled by a further downstream channeling device 150 which may be provided between different cleaning surfaces of the novel cleaning element 62. Finally, a finishing or detailing pad portion 152 for detailing may be provided near the end of the novel cleaning element 62 for reaching into openings such as air scoops on the hood of the vehicle as illustrated in FIGS. 51 and 52. into openings of a scoop or louver 156. Finishing pad portion 152 may include a plurality of radially projecting brushes or bristles 158 of varying lengths (FIG. 18) and may include various orientations (FIG. 52) to reach into and clean the underside of scoops or louvers 156 of vehicle 68. In addition the top side of the finishing pad portion 152 may include an articulated hinged area or articulation means 160 to allow the end portion to resiliently move upward and downward with respect to the elongated plane of the novel cleaning element 62. The articulation means 160 may be provided to assist in the bending of one or more portions of the finishing pad or a second cleaning surface down into the scoops and louvers 156 of vehicle 68.

The novel pad may further include an angled wiper end 161 for drying areas cleaned by the first and second cleaning surfaces as well as the finishing surfaces of the novel cleaning element.

Figure 27:
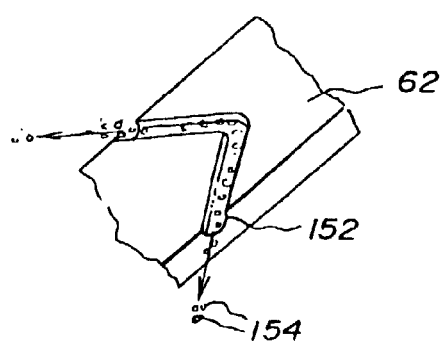
FIG. 27 is a bottom plan view of a portion of a novel cleaning element including dirt removal cleaning channels.

The channeling means 150 illustrated in FIGS. 17, 18 and 27 may be accomplished by modifying the flat elongated profile of the novel cleaning element 62 into a wavy resilient end 162 (FIG. 19) in which the rubbing action provided by cleaning portion 142 terminates in a ribbon candy shaped portion 164 that allows dirt and debris to be channeled laterally between undulations 166 which terminate in a radially projecting prong 82 which may be tapered and provide resiliency perpendicular to the x-axis of the elongated pad but also along the y-axis as well as the z-axis as illustrated in FIG. 19 as well as in FIG. 52.

Figure 22:
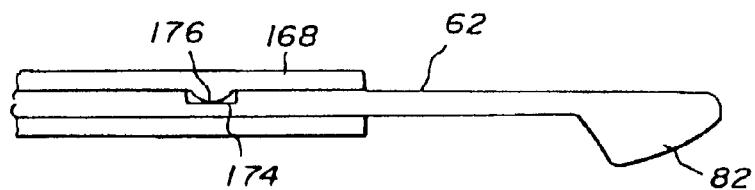
FIG. 22 is a side elevational view of a novel cleaning element having projecting prongs or tines in accordance with an alternative embodiment of the invention.
Figure 21:
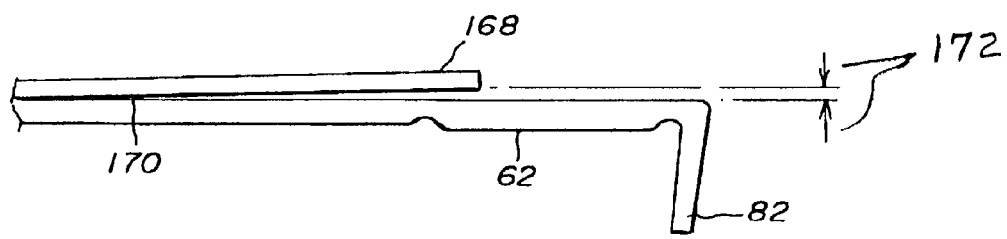
FIG. 21 is a side elevational view of a novel cleaning element similar to the cleaning element of FIG. 20 employing a stiffener.

Referring now to FIGS. 20, 21, 22 and 23 further embodiments of the novel cleaning elements 62 are illustrated having projecting prongs or tines 82 for reaching into and removing dirt and debris from crevices and openings on an irregular surface of a vehicle. In FIGS. 20, 21, 22 and 23 stiffeners 168 are provided for increasing the forces acting upon the surface of the vehicle. The stiffeners 168 are preferably made of the closed cell polyolefin foam material and are provided to stiffen or increase the effectiveness of the projecting prongs 82 for reaching into openings and crevices and seams and removing dirt from the on the surface of a vehicle. Stiffener 168 is designed to be solidly attached at area 170 (FIG. 21) to cleaning element 62 but allow an angular motion between the stiffener 168 and the projecting prong as represented by confronting arrows 172. Various means may also be provided between the stiffener 168 and novel cleaning element 62 to impart a variable resistance to the downward forces provided by stiffener 168. As illustrated in FIG. 22 an opening 174 is provided in novel cleaning element 62 which is captured by semispherical structure 176 for providing a variable downward resistance force between stiffener 168 and novel cleaning element 62. Stiffeners 168 may also be provided between novel cleaning elements 62 as illustrated in FIG. 23.

Referring now to FIGS. 28, 29, 30 and 31 further embodiments of the novel cleaning element 62 are illustrated in which the first and second cleaning surfaces of the novel cleaning element 62 are constructed of a closed cell high density elastomeric foam that may be molded or cut to form the novel cleaning elements for attachment to mitters or rotational cleaning equipment depending upon desired use. The novel cleaning elements 62 as illustrated in FIGS. 28–32 are preferably composed of a closed cell polyolefin foam and include a plurality of longitudinal slits 74 for forming a plurality of projecting prongs 82 for reaching into and cleaning openings and crevices. The projecting prongs 82 may have articulating means 160 provided by a groove 178 in the closed cell foam forming the body of the novel cleaning element 62. A tapered or narrowed portion 112 may be provided to assist in the reaching into of openings and crevices as heretofore has been described with reference to FIG. 12. The closed cell foam body of the novel cleaning element 62 may also include an inner core portion 180 for modifying the resilient properties and be used to impart a variable resistance to the second cleaning surface of the novel cleaning element 62.

Referring now to FIGS. 33–41 and 50 various configurations for the second cleaning surface for the novel cleaning elements 62 are illustrated having radially projecting prongs 82. The radially projecting prongs 82 radially project from the flat elongated surface of the novel cleaning elements 62 and spaces between the prongs or tines provide for channeling means 150 for the removal of dirt and water between the projected prongs or tines 82. In the best mode of the invention the projecting prongs 82 provide a combination of cleaning and channeling to remove dirt from cleaned structures. The projecting prongs of the novel cleaning element 62 can take an infinite variety of shapes as illustrated in FIGS. 41–49 through which channeling means can be provided by spacing the projecting prongs 82 along the surface of the novel cleaning elements 62.

As heretofore indicated the novel projecting prongs 82 of the novel cleaning elements 62 can be formed in a variety of ways and be provided at the ends or intermediate the ends of the novel cleaning elements 62. Further the projecting prongs and the resiliency of the projecting prongs may be modified by utilizing stiffeners such as heretofore described with respect to FIGS. 20–23 and 32 to impart and modify the resiliency of the novel projecting prongs or tines 82.

Figure 53:
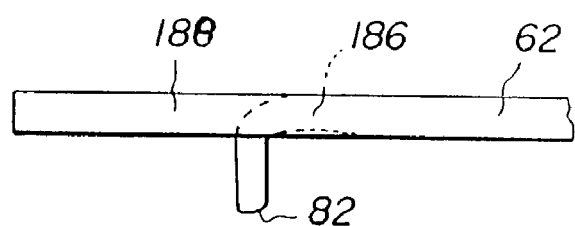
FIG. 53 is a side elevational view of a novel cleaning element having a partially retractable projecting prong or tine.
Figure 54:
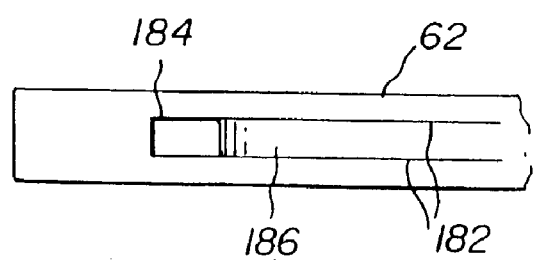
FIG. 54 is a top plan view of the novel cleaning element of FIG. 53.

The novel projecting prongs of the second cleaning surface can also be made as semi-retractable projecting prongs as illustrated in FIGS. 53 and 54. The novel semi-retractable projecting prongs 82 are provided by utilizing a pair of slits 182 in a closed cell high density foam cleaning element and a perpendicular slit 184 to pull through the strip 186 and providing a bend in the strip 186 to form a semi-retractable projecting prong 82. In this embodiment of the invention the projecting prong 82 is able to move perpendicular to body 188 in the pair of slits 182 to provide a semi-retractable projecting prong 82 for cleaning crevices, seams and openings on the surface of the vehicle in accordance with the invention.

Figure 25:
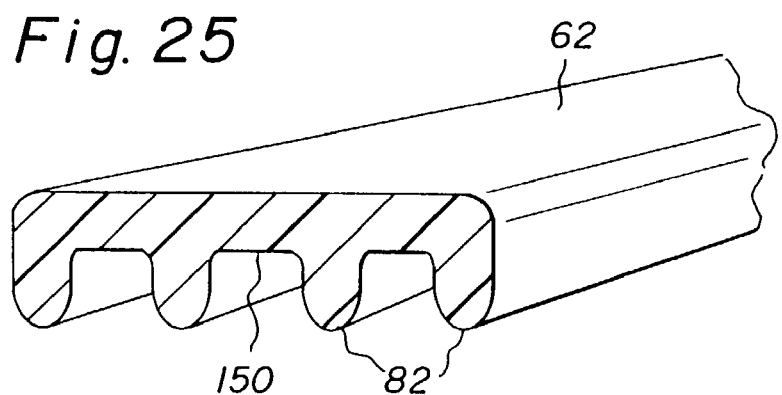
FIG. 25 is a perspective view of a novel cleaning element having projective prongs or tines constructed in accordance with a further embodiment of the invention.
Figure 26:
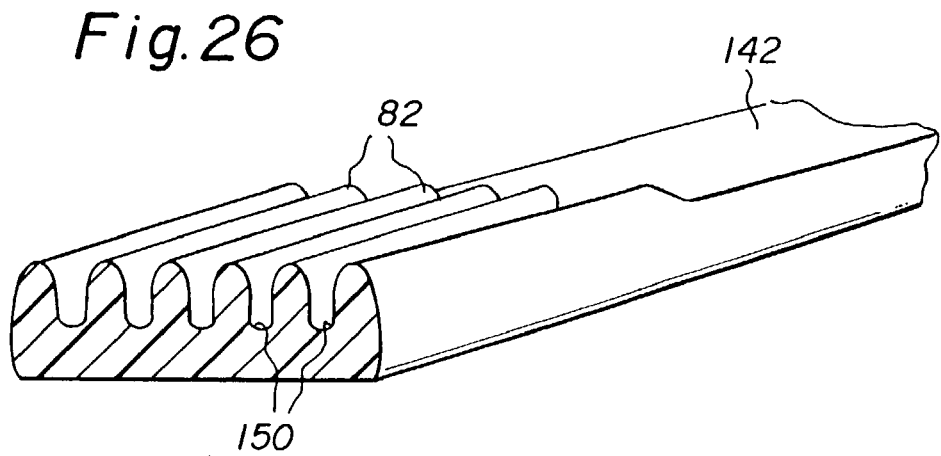
FIG. 26 is a further embodiment of a novel cleaning element having projecting prongs or tines constructed in accordance with a further embodiment of the invention.
Figure 28:
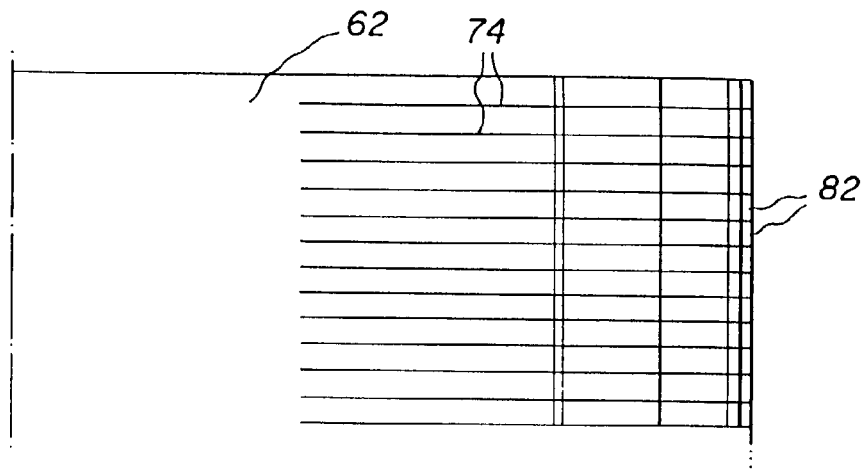
FIG. 28 is a bottom plan view of a further embodiment of a novel cleaning element with projecting prongs or tines constructed in accordance with a further embodiment of the invention.
Figure 29:
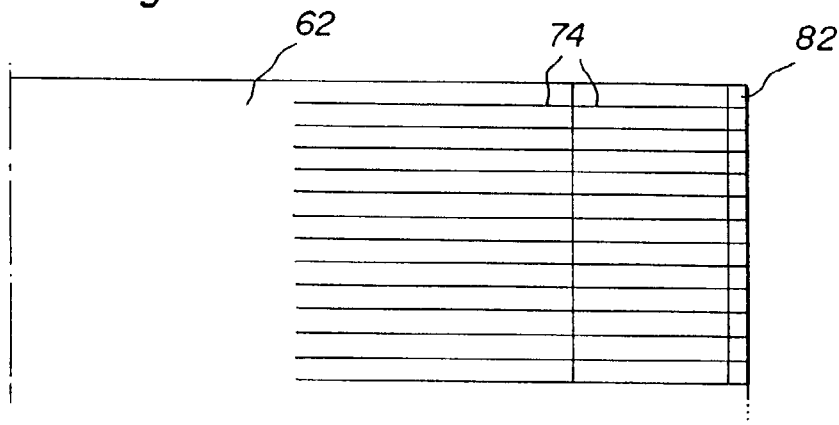
FIG. 29 is a top plan view of the novel cleaning element of FIG. 28.
Figure 30:
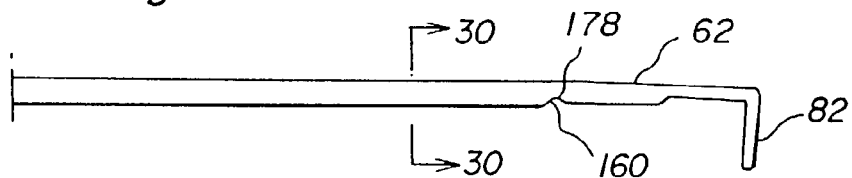
FIG. 30 is a side elevational view of the novel cleaning element of FIG. 28.
Figure 31:
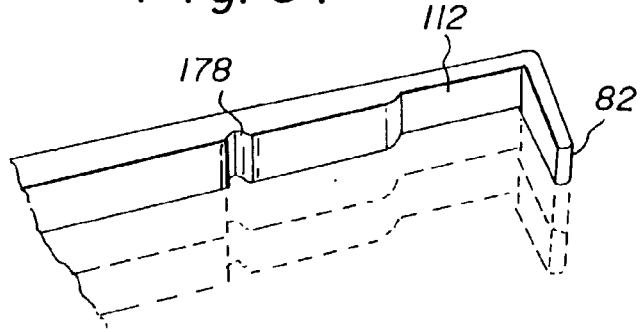
FIG. 31 is a perspective view of one of the projecting prongs or tines of the novel cleaning element of FIG. 28.
Figure 32:
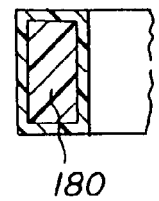
FIG. 32 is a cross sectional view of the novel cleaning element taken along the line 30—30 of FIG. 30.
Figures 42, 43, 44, 45:
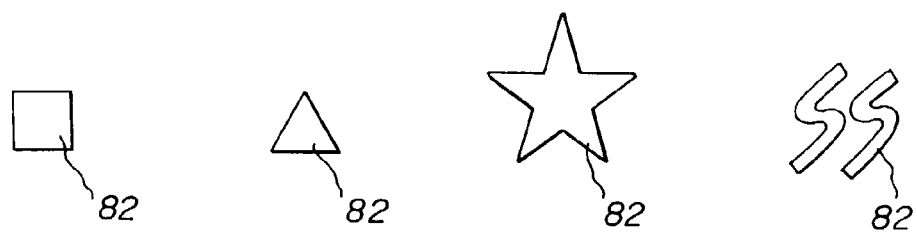
FIGS. 42–49 are bottom plan views of examples of a variety of shapes that can be utilized for projecting prongs or tines for novel cleaning elements constructed in accordance with the invention.
Figures 46, 47, 48, 49:
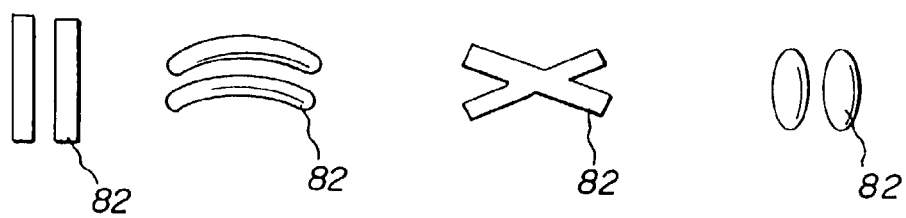
Figure 50:
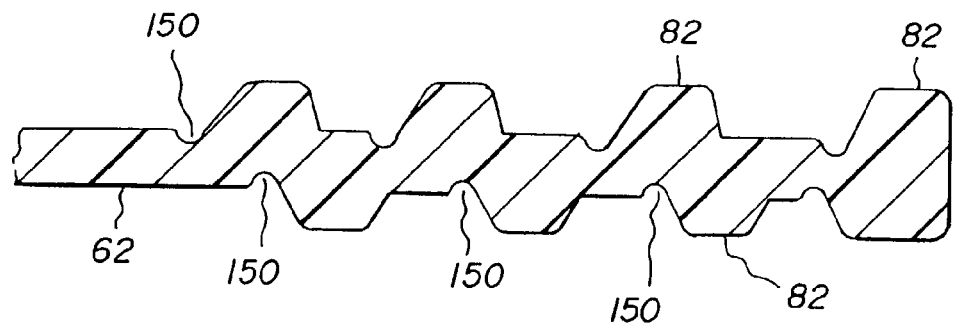
FIG. 50 is a side view of a novel cleaning element having projecting prongs or tines for a cleaning element with provision for water channeling constructed in accordance with a further embodiment of the invention.

Referring now to FIGS. 25 and 26 a further embodiment of a novel mitter cleaning element 62 is illustrated having projecting prongs 82 and channeling means 150 disposed between the projecting prongs 82. The projecting prongs 82 are parallel to the elongated axis of the novel cleaning pad and may be of different elongated lengths and configurations to assist in cleaning dirt and debris from crevices on the surface of vehicles. The novel cleaning elements 62 as illustrated in FIGS. 25 and 26 include a first cleaning portion 142, particularly useful for cleaning long flat surfaces of vehicles in combination with a second cleaning surface provided by radially projecting prongs 82 parallel to the longitudinal plane of the novel cleaning element which assist in cleaning seams disposed along the surface of hoods of vehicles as are now in contemporary fashion.

As will be recognized by those skilled in the art the novel cleaning elements of the invention are susceptible to a wide range of embodiments and applications in automatic vehicle washing equipment. As heretofore discussed the novel cleaning pads of the invention can be utilized in mitter type automatic car washing equipment in which long strips are appended from an automatic mitter device which may be stationary or oscillate with respect to a moving or stationary vehicle. The novel cleaning elements may also be mounted in structures in which the mitters move with respect to the vehicle such that the mitter pad cleans only in one direction with respect to the vehicle in which case the novel projecting prongs radially project in only one direction from the novel cleaning pad. In applications where the mitter pad moves in both forward and reverse directions and cleans in both directions the projecting prongs radially project from opposite or all of the planar surfaces of the substantially elongated planar cleaning pads of the invention.

The novel cleaning elements may also be mounted to rotatable cleaning elements in which case the novel projecting prongs can project radially only in one direction from the flat planar elongated surface or where the automatic rotatable car washing device rotates in both directions, the novel projecting prongs or tines may project in both directions of rotation or project from both ends of the pad in the same or opposite directions so that the pad may be folded and held in place by a restraining rod in the novel car washing equipment.

Further as heretofore described the novel projecting prongs or tines may be disposed at either end of the novel cleaning pad of the invention or may project from points intermediate the ends of the novel cleaning pad to provide the advantages of the invention. The novel resilient cleaning pad utilizing the projecting prongs may include water channeling devices and means for partially retracting the prongs to impart further advantages in the invention. The radially projecting prongs or tines may also be resilient in all three axes and may be constructed of the same or different materials to provide superior cleaning of automobile surface over the prior art. These and other modifications in the shape, arrangement, disposition and material from which the radially projecting prongs or tines may be constructed can be made by those skilled in the art and should be considered within the scope of the invention as included in the appended claims.

As used herein and in the following claims, the word 'comprising' or 'comprises' is used in its technical sense to mean the enumerated elements include but do not exclude additional elements which may or may not be specifically included in the dependent claims. It will be understood such additions, whether or not included in the dependent claims, are modifications that both can be made within the scope of the invention. It will be appreciated by those skilled in the art that a wide range of changes and modification can be made to the invention without departing from the spirit and scope of the invention as defined in the following claims:

What is claimed is:

1. A cleaning element comprising:
   (a) a substantially flat resilient elongated cleaning element having a front side and back side and a first end and a second end and at least one substantially flat cleaning surface disposed on said front side intermediate said first end and said second end;
   (b) at least one resilient prong radially projecting outwardly on the front side of said at least one substantially flat cleaning element and from each end of said substantially flat resilient elongated cleaning element; and
   c) an attachment area on said substantially flat elongated element for attachment to an automatic car washing device, said attachment area disposed intermediate said first end and said second end and said attachment area providing for the bending of said cleaning element to place portions of said back side in a laterally adjacent configuration.

2. The cleaning element of claim 1 further comprising a water channeling groove disposed intermediate the ends of said substantially flat resilient elongated element.

3. The cleaning element of claim 1 further comprising a stiffener.

4. The cleaning element of claim 1 further comprising means for modifying the resiliency of said resilient prongs.

5. The cleaning element of claim 1 wherein at least one of said resilient prongs terminates in a substantially flat cleaning surface.

6. The cleaning element of claim 1 wherein said at least one resilient prong projecting from said first end and said second end projects outwardly and rearwardly toward said at least one substantially flat cleaning surface.

7. The cleaning element of claim 1 wherein said attachment area is in the middle of said substantially flat resilient elongated cleaning element.

8. The rotatable cleaning pad of claim 7 wherein said attachment area divides said at least one substantially flat cleaning surface into a first cleaning surface and a second cleaning surface.

9. A rotatable cleaning pad comprising:
   (a) a substantially flat planar element having a front side and a back side and a first end and a second end and a flat cleaning surface disposed at said front side parallel to the longitudinal axis of said substantially flat planar element;
   (b) a first resilient prong radially projecting at an angle to said longitudinal axis to form an angled cleaning surface disposed radially to said flat cleaning surface on said front side and disposed at said first end of said substantially flat planar element;
   (c) a second resilient prong radially projecting at an angle to said longitudinal axis to form a second angled cleaning surface disposed radially to said flat cleaning surface on said front side and disposed at said second end of said substantially flat planar element; and
   d) an area intermediate said first resilient prong and said second resilient prong for attaching said substantially flat planar element to a rotatable cleaning element.

10. The rotatable cleaning pad of claim 9 further comprising a second flat cleaning surface disposed on the back side of said substantially flat planar element.

11. The rotatable cleaning pad of claim 9 further comprising a stiffener disposed on the back side of said substantially flat planar element.

12. The rotatable cleaning pad of claim 9 further comprising means for modifying the resiliency of said resilient prongs.

13. The rotatable cleaning pad of claim 12 wherein said means for modifying the resiliency of said resilient prongs is a stiffener.

14. The rotatable cleaning pad of claim 9 wherein said area intermediate said first resilient prong and said second resilient prong for attaching said substantially flat planar element is equidistant from said first resilient prong and said second resilient prong.

15. The rotatable cleaning pad of claim 9 further comprising a water channeling groove disposed in said substantially flat cleaning surface.

16. The rotatable cleaning pad of claim 9 wherein said flat cleaning surface is composed of a felt cloth material.

17. A mitter cleaning element comprising:
   (a) a substantially flat elongated element having a first side and a second side and a first end and a second end and having a first and a second substantially flat cleaning surface disposed on said first side of said substantially flat elongated element;
   (b) a first plurality of resilient prongs radially projecting from said first end of said first side of said substantially flat cleaning element to form a first angled cleaning surface radially projecting from said first end of said substantially flat elongated element, said first substantially flat cleaning surface providing a rubbing cleaning action and a portion of said substantially flat cleaning surface providing leverage for said first plurality of resilient prongs;
   (c) a second plurality of resilient prongs radially projecting from said first side at said second end of said substantially flat cleaning element to form a second angled cleaning surface radially projecting from said second end of said substantially flat elongated element, said second substantially flat cleaning surface providing a rubbing cleaning action and a portion of said second substantially flat cleaning surface providing leverage for said second plurality of resilient prongs; and
   (d) means for attaching said substantially flat elongated element to an automatic car washing device.

18. The mitter cleaning element of claim 17 further comprising means for modifying the resiliency of said first plurality and said second plurality of resilient prongs.

19. The mitter cleaning element of claim 17 further comprising a water channeling groove disposed intermediate the ends of said substantially flat elongated element.

20. The mitter cleaning element of claim 17 wherein said substantially flat elongated element is comprised of a high density polyolefin closed cell foam.

* * * * *